United States Patent
Fitzgibbons

[11] 3,838,909
[45] Oct. 1, 1974

[54] AMBIENT ILLUMINATIONS SYSTEM FOR LIQUID CRYSTAL DISPLAY

[75] Inventor: Eugene T. Fitzgibbons, Anaheim, Calif.

[73] Assignee: Rockwell International Corporation, El Segundo, Calif.

[22] Filed: Apr. 6, 1973

[21] Appl. No.: 348,838

[52] U.S. Cl. ............ 350/160 LC, 240/2.1, 350/286
[51] Int. Cl. .............................................. G02f 1/16
[58] Field of Search ....... 350/10, 236, 286, 160 LC; 240/2.1

[56] References Cited
UNITED STATES PATENTS

| | | | |
|---|---|---|---|
| 2,761,056 | 8/1956 | Lazo | 350/112 X |
| 3,502,416 | 3/1970 | Rickert | 350/10 X |
| 3,581,002 | 5/1971 | Dodds | 350/160 LC X |
| 3,655,270 | 4/1972 | Creagh | 350/160 LC |

Primary Examiner—Edward S. Bauer
Attorney, Agent, or Firm—H. Fredrick Hamann; G. Donald Weber, Jr.

[57] ABSTRACT

Readability and attractiveness of a transmissive liquid crystal display are enhanced by a uniform illumination system that employs ambient light. A simple glass or plastic prism is placed behind the display and arranged so that the back surface of the prism effects total internal reflection of ambient light. The light is then projected from the prism through the liquid crystal display panel. Light travelling in the other direction, i.e., through the display panel to the prism, passes out through the back surface of the prism into a light absorptive material so that the observer will view a bright, white display on a black background.

8 Claims, 5 Drawing Figures

AMBIENT ILLUMINATIONS SYSTEM FOR LIQUID CRYSTAL DISPLAY

BACKGROUND OF THE INVENTION

1. Field of the Invention

The present invention relates to display devices and more particularly concerns improved illumination for a liquid crystal display.

2. Description of Prior Art

A common type of liquid crystal display device comprises a pair of closely juxtaposed but mutually spaced plates, at least one of which is glass, that are sealed to each other to define a chamber. The facing inner surfaces of the two plates are provided with patterns of electrically conductive films or electrodes that may be selectively energized by electrical signals. A liquid crystal material is confined in the chamber between the plates. The electrodes on the facing inner surfaces of the two plates are selectively energized to provide an electric potential across specific areas of the thin film of liquid crystal material. The latter, which is normally transparent, then becomes opalescent, scattering light that impinges thereon and thus provides the viewer with a visual contrast between the light scattering areas and the passive transparent areas of the liquid crystal material. Details of operation and construction of exemplary types of such liquid crystal display panels are described in full detail in the copending applications identified infra.

The present application is related to the following copending applications. An application for Nematic Liquid Crystal Composition, Ser. No. 87,515, filed by Roger Chang and John B. Dobbins on Nov. 6, 1970, and a continuation thereof, Ser. No. 297,172, filed on or about Oct. 12, 1972.

All of the above-mentioned copending applications are assigned to the assignee of the present application and disclosures of each of such applications are incorporated by this reference as though fully set forth herein.

Liquid crystal devices of the type described may provide either a reflective type display or a transmissive type display. The reflective type display depends upon illumination that strikes the display from the front. Such illumination is scattered back toward the viewer by activated areas of the confined liquid crystal material. In the reflective arrangement, certain viewing esthetics have been sacrified in order to take advantage of the ambient light and, therefore, to save power.

The transmissive type display is illuminated from the back by a built-in light source. This improves readability and attractiveness as compared with the reflective type but requires expenditure of power for the light source, a space for mounting the light source, and a space for light diffusing apparatus.

U.S. Pat. No. 3,674,341 to C. L. Hedman, Jr., et al. describes various aspects of the problem of increasing contrast ratio of liquid crystal display panels including contrasting masks, modified compositions of liquid crystal material, cross-polarization devices, and specifically describes details of an arrangement for directing a beam of light from a light source within the device that is formed as part of the display. A light beam is directed obliquely onto the surfaces of the transparent plates. However, the arrangement of Hedman, Jr., et al. employs a pair of light sources and reflective panels all confined within the housing that mounts the liquid crystal display itself. As previously indicated, power and space requirements of such an arrangement are serious disadvantages. Accordingly, it is an object of the present invention to enhance the readability of a liquid crystal display employing ambient illumination.

SUMMARY OF THE INVENTION

In carrying out principles of the present invention in accordance with a preferred embodiment thereof, a transmissive liquid crystal display panel having front and back sides is disposed to be viewed from the front side thereof. Means are positioned at the back side of the panel for receiving ambient light and effecting total internal reflection of the ambient light through the liquid crystal panel from the back side to the front side thereof for reception by the eye of the viewer. Means are also provided for decreasing reflection of light that passes through the liquid crystal panel from the front to the back side thereof.

DETAILED DESCRIPTION

Figure 1:
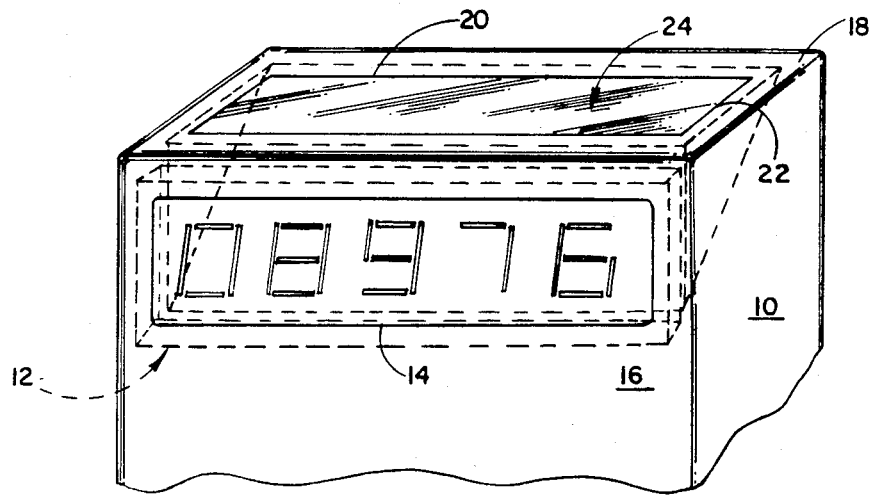
FIG. 1 is a front pictorial view of a part of an apparatus having a liquid crystal display panel embodying principles of the present invention.

Throughout the drawings and the description, similar elements bear similar reference numerals.

As illustrated in FIG. 1, a display device embodying principles of the present invention is incorporated in an appartus, such as for example, a hand-held miniature electronic calculator. The apparatus includes housing 10 in which are mounted electrical and mechanical operating components (not shown). Also mounted in the housing is a display device such as a liquid crystal display panel 12 that visually presents numbers, letters or other characters employed in or resulting from operations performed by the apparatus. It will be readily appreciated that display panel 12 may provide display patterns and characters of any desired type. Specific details of such a display or character configuration may be varied widely without departing from principles of the present invention. The invention is applicable to many different types of displays and display patterns and may be specifically arranged for use in a liquid crystal display apparatus of the type described in detail in the above-mentioned copending applications.

DESCRIPTION OF A PREFERRED EMBODIMENT

Briefly, according to the present invention, liquid crystal display panel 12 is mounted at the front of housing 10 so as to permit ready viewing thereof through an aperture 14 by an observer positioned in front of the aperture 14. Aperture 14 is preferably formed in front side 16 of housing 10.

The top 18 of the housing includes a second aperture 20 that may be similar in size to aperture 14. Aperture 20 permits passage of ambient light directed from above and behind panel 12 to be received and collected by the top surface 22 of prism 24. The prism is mounted in housing 10 behind display panel 12 in a suitable arrangement.

Figure 2:
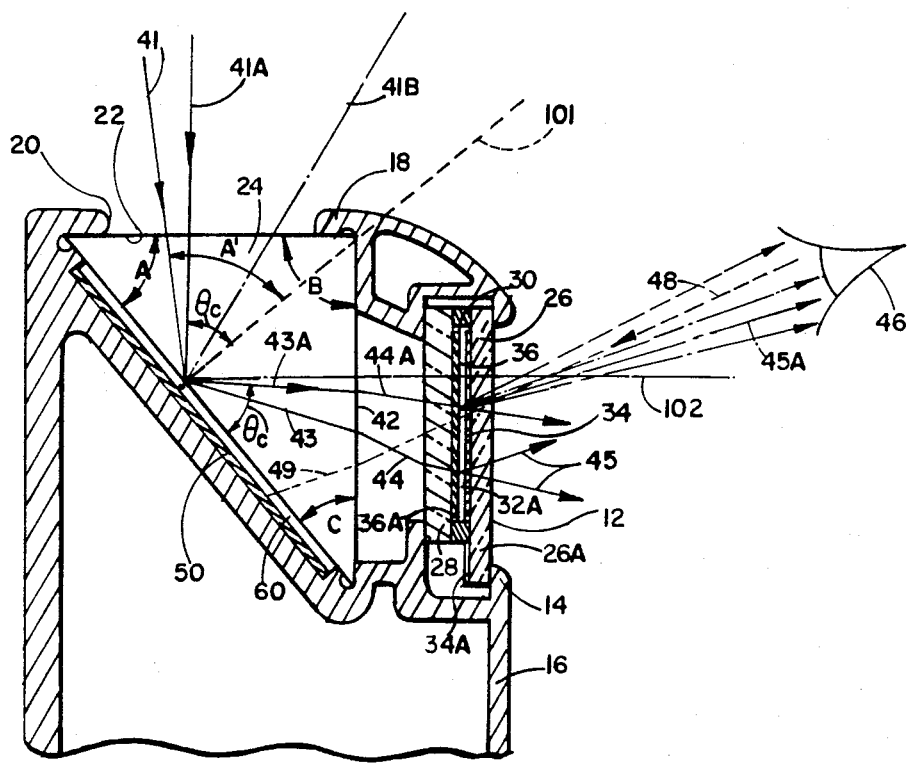
FIG. 2 is a sectional view of one embodiment of the liquid crystal display panel and prism of the apparatus illustrated in FIG. 1.

Reference is made now to FIG. 2. A typical liquid crystal display panel 12 includes first and second transparent plates 26 and 28 sealed to each other by means of a peripheral spacer 30. Plates 26 and 28 may preferably be fabricated of glass or the like. Spacer 30 cooperates with glass plates 26 and 28 to form one or more cells or chambers 32 for retaining liquid crystal film 32A that is interposed between the two facing inner surfaces of the plates. The inner surface of front plate 26 has a plurality of conductive character segments 34 collectively forming character patterns, such as those illustrated in FIG. 1. The inner surface of back plate 28 has a common electrode 36 formed thereon. The electrodes are connected to conductors 34A and 36A formed on the plate surfaces to receive selective electrical energization from external circuitry (not shown).

As is well known, the liquid crystal material interposed between the inner surfaces of the plates 26 and 28 is normally transparent. When an electric potential is applied across a particular area thereof, such area becomes opalescent and scatters incident light. Accordingly, where a potential difference is applied between an electrically conductive segment on the front plate and an electrically conductive segment on the back plate that is in registration therewith, (e.g., in alignment along a line normal to the extent of the interposed thin film of nematic liquid crystal material), the interposed liquid crystal material will be activated to provide a display that is readily distinguished visually.

For the transmissive display described herein, the electrodes (or conductive segments) on both the front and back plates are made transparent. For example, the electrodes may be fabricated of a tin oxide. In addition, both plates are made of transparent material, for example, glass.

In accordance with the present invention, illumination of the transmissive display by means of external ambient light is provided by mounting prism 24 to the rear of the back plate 28. In fact, the liquid crystal panel may be affixed directly to or even formed on surface 42 of prism 24. The prism is firmly secured to the housing in a fixed relation to the liquid crystal display panel 12. The housing is provided with suitable means, such as a detachable side and/or back panels to facilitate assembly of the internal parts, including the display panel and prism.

Prism 24 has an outwardly directed light receiving and collecting surface 22 and a front light transmitting surface 42. Surface 40 is arranged, relative to surfaces 22 and 42, so that light entering surface 22 is reflected by surface 40 through surface 42 when the light entering surface 22 is greater than the critical angle as defined infra. Of course, light entering at less than the critical angle will be transmitted through surface 40 and absorbed by light absorbing surface 50. Conversely, light entering the prism through surface 42 at greater than the critical angle will be reflected by surface 40 through surface 22. Light entering surface 42 at less than the critical angle will be transmitted through surface 40 and absorbed by light absorbing surface 50. However, as a practical matter, the light entering surface 42 is of little or no consequence. That is, an observer 46 views display unit 12 from a position adjacent to surface 42. Therefore, only the light entering through surface 22 is important in this invention.

By proper arrangement of the display and associated optical prism in housing 10, observer 46 will normally observe the display at an angle wherein the display is substantially visible against an opaque background supplied by surface 50. It is conceivable, that observer 46 could, through dexterous experimentation, possibly view through surface 42 at an angle such that surface 22 is observed. In other words, observer 46 could conceivably view the totally internally reflected image of the light source above or adjacent to surface 22. However, as indicated supra, this type of arrangement is unlikely and is readily avoided by appropriate mountings of the prism in the housing.

Surfaces 40 and 42 are polished and smooth. Surface 22, the top face of the prism, may be treated or configured in order to allow more light to be gathered thereby. Prism 24 may be made of a number of different types of transparent materials, such as clear plastic, glass, quartz or the like.

The angles of the prism are chosen such that incident rays of ambient light impinging upon and transmitted through light receiving surface 22, such as ray 41, strike the back reflecting surface 40 of the prism at an angle A' that is greater than the critical angle of the prism. As is well known, the critical angle $\theta_c$ is the minimum angle at which a ray of light incident upon the surface of a medium of greater index of refraction that interfaces with a medium of lesser index of refraction is subject to total internal reflection. When prism 24 is of crown glass, for example, and the external medium 60 adjacent the back surface 40 is of air, the critical angle is about 42°. The critical angle for water and air is 49°. For more dense materials, such as diamond, for example, the critical angle is 24°. The critical angle is measured from a line or plane 101 normal to reflecting surface 40 such as angle $\theta_c$ in FIG. 2. If the angle of incidence is less than the critical angle (see light ray 41B), part of the incident light may be reflected but the major part of the light is refracted and transmitted through the interface between the media. At the critical angle $\theta_c$ and angles greater than the critical angle, all of the light incident upon the internal reflecting surface is reflected as suggested by rays 41 and 41A.

As shown in FIG. 2, when incident ray 41 impinges upon surface 40 (i.e., the interface between the prism and the air adjacent thereto) at an angle A' which is greater than the critical angle, all of the light indicated by the ray 41 is reflected as indicated by ray 43. This reflected light is refracted (unless at 90°) as it exits front surface 42 of the prism, as is indicated by ray 44. Ray 44 then passes through the transparent back plate 28, through a portion of liquid crystal material 32A interposed between the two plates and, thence, through front plate 26. When the liquid crystal material is activated by a potential difference between the electrodes on the opposite sides thereof, ray 44 is scattered as indicated by rays 45 and is observed by viewer 46 in front of the liquid crystal display panel. Similarly, ray 41A (very near to the critical angle) is reflected as ray 43A, refracted as ray 44A, and, when appropriate, scattered as rays 45A.

As suggested supra, with observer 46 positioned as shown, the display is viewed as having an opaque background. Rays 45 and 45A from the display are readily visible to observer 46. Thus, observer 46 views along the lines 48 and 49. Only by moving to a position below ray 45 can observer 46 avoid the display and view through surface 22.

Typically, the prism is made with acute angles A and C as well as a right angle B. Typically, angle A is greater than the critical angle, for example 50°, in order to insure total internal reflection of a significant amount of the ambient light received through top surface 22. Angle C is an angle of about 40° in this exemplary right-angle prism. Obviously, other angles may be employed to achieve total internal reflection as previously described. Back surface 40 should be arranged at an angle, relative to normal 102 to the plane of liquid crystal display 12, which is not significantly less than the critical angle at the interface of the material of the prism body and the air or other medium adjacent the exterior of back side 40 of the prism. If the angle between the surface 40 and normal 102 is less than the critical angle, a lesser amount of light received by prism surface 22 will be reflected by surface 40. That is, a smaller amount of the light at surface 22 will impinge upon surface 40 at an angle greater than the critical angle, and, thus, suffer total internal reflection. Accordingly, to increase the amount of ambient light at surface 22 that is subject to total internal reflection, the angle between surface 40 and panel 12 is made somewhat greater than the critical angle.

Figure 3:
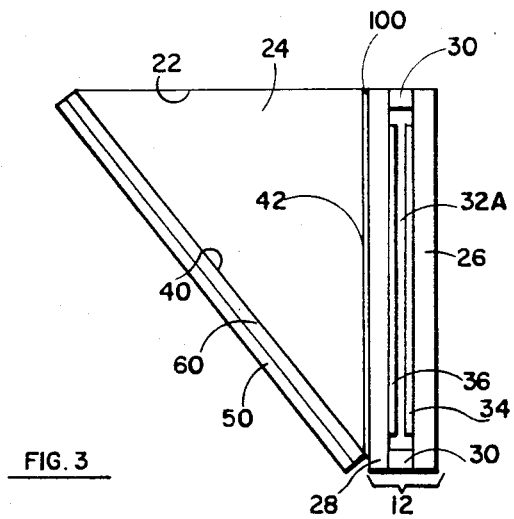
FIG. 3 is a sectional view of another embodiment of the instant invention.

Referring now to FIG. 3, there is shown another embodiment in the instant invention. In this embodiment, housing 10 has been omitted for clarity. However, prism 24 is substantially similar to prism 24 shown in the other figures. That is, the angular relationships are substantially similar in order to achieve the same critical angle relationship between the incident light, reflected light, and the display panel.

In the embodiment shown in FIG. 3, display panel 12 is fixed directly to the surface of prism 24. That is, the outer surface of back plate 28 and surface 42 of prism 24 are substantially butted together. A suitable transparent adhesive 100 such as epoxy, optical coupling grease or the like is used to join plate 28 to surface 42 or prism 24. Transparent adhesive 100 may be of any suitable material which has a sufficiently high index of refraction to efficiently couple light emitted from surface 42 into the liquid crystal cell 24.

Figure 4:
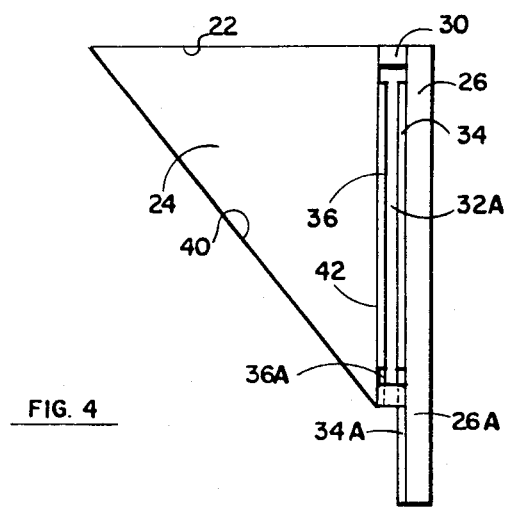
FIG. 4 is a sectional view of another embodiment of the instant invention.
Figure 5:
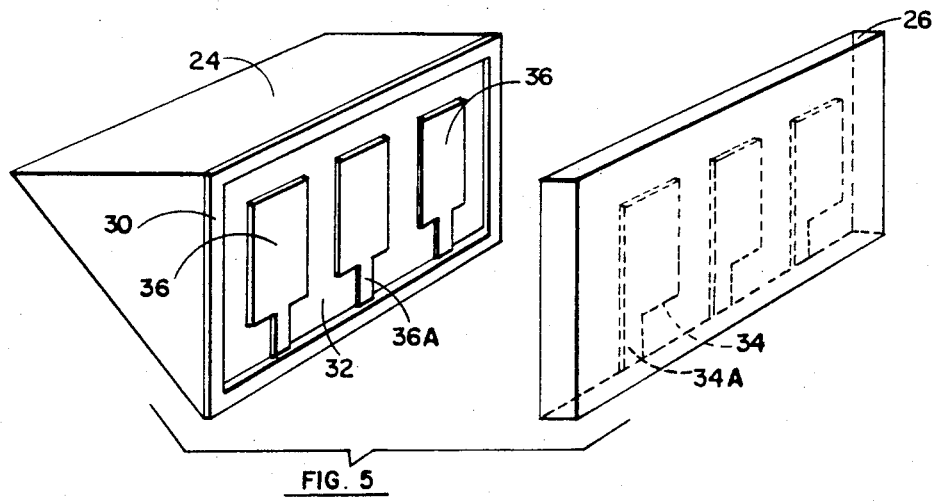
FIG. 5 is an exploded view of the embodiment shown in FIG. 4.

Referring now to FIGS. 4 and 5 concurrently, another embodiment of the instant invention is provided. In this embodiment, a substantially modular configuration is also provided. This is, surface 42 of prism 24 functions as the backplate of display 12. Thus, back electrodes 36 are deposited, in any suitable manner, upon surface 42 of prism 24. Binder or sealer 30 is provided substantially around all of the periphery of surface 42 of prism 24. Electrodes 34 are deposited in a suitable manner on the inner surface of plate 26. Front plate 26 is affixed to prism 24 by means of binder 30. In addition, plate 26 may be extended beyond the length of surface 42 of prism 24. The extended portion 26A would include conductor elements 34A which are connected, through suitable techniques, to electrodes 34. Conductors 34A, in combination with extended portion 26A, form a pluggable unit which may be plugged into any suitable receptacle. Moreover, through suitable techniques such as suggested in the copending application of Fitzgibbons et al entitled "Liquid Crystal Display Device" bearing Ser. No. 189,991, filed Oct. 18, 1971, now U.S. Pat. No. 3,751,137 and assigned to the common assignee, conductors 36A associated with electrodes 36 may be also connected to suitable conductors similar to conductors 34A on extension 26A. Extension 26A permits a pluggable relationship between the modular unit shown in FIGS. 4 and 5 and a suitable receptacle. Thus, a completely unitized modular system is effected for this type of device.

There have been described a method and apparatus for efficiently gathering ambient light and directing it through a transmissive liquid crystal display panel and at the same time isolating a viewer from the source of the light so as to increase contrast ratio. The prism mounted behind the transmissive liquid crystal display maximizes reflection of ambient light received from above and behind the display. In addition, this apparatus minimizes reflection of light entering the prism from the front of the liquid crystal display panel to thereby provide to a viewer positioned in front of the panel a bright, white display pattern upon a black background.

The foregoing detailed description is to be clearly understood as given by way of illustration and example only, the spirit and scope of this invention being limited solely by the appended claims.

What is claimed is:

1. An electro-optical display device comprising:
   a liquid crystal display panel having a front side and a back side and disposed to be viewed from the front side thereof,
   light transmitting means positioned at the back side of said panel for receiving ambient light and for effecting total internal reflection of such ambient light through said liquid crystal display panel from the back side to the front side thereof for reception by the viewer,
   said light transmitting means comprising a body of transparent material having a planar reflecting surface in contact with an external medium, said reflecting surface extending at an angle relative to a normal to the plane of said liquid crystal display panel that is not less than the critical angle between the material of said body and said external medium, and
   light absorbing means disposed adjacent the planar reflecting surface of said light transmitting means for inhibiting reflection by said light transmitting means of light passing through said liquid crystal panel from the front side to the back side thereof.

2. The apparatus of claim 1 wherein said light transmitting means comprises means for reflecting ambient light directed thereto from a point above said liquid crystal display panel.

3. The apparatus of claim 1 wherein said light absorbing means extends along but is spaced from said reflecting surface of said body.

4. The apparatus of claim 1 wherein said light transmitting means comprises an optical prism mounted behind said liquid crystal display panel, said prism having an ambient light receiving surface facing outwardly relative to said liquid crystal display panel, having an internal light reflecting surface extending at an angle with respect to a normal to said liquid crystal display panel that is greater than the critical angle between said reflecting surface and an external medium adjacent thereto, and having a third surface adjacent the back side of said liquid crystal display panel.

5. An electro-optical display comprising:

a liquid crystal display panel having front and back transparent plates sealed to each other in mutually spaced juxtaposition to define a chamber therebetween, a liquid crystal material confined within said chamber, selectively actuatable transparent electrodes formed on facing inner surfaces of said front and back glass plates, a prism mounted behind said liquid crystal display panel, said prism having a light receiving surface facing in a direction substantially perpendicular to the extent of said liquid crystal display panel for receiving ambient light impinging thereon, a reflecting surface in contact with an external medium and extending at an angle with respect to a normal to said front and back plates of said liquid crystal display panel that is not less than the critical angle of the material of said prism and of said medium, whereby ambient light entering said prism through said light receiving surface and impinging upon said reflecting surface is subject to total internal reflection and is directed through the plates of said liquid crystal display panel, and a light absorbing background material mounted for receiving light transmitted to said prism from the front of said liquid crystal display panel, whereby reflection of light entering said prism through said liquid crystal display panel is minimized.

6. The electro-optical display recited in claim 5 wherein said back plate of said liquid crystal display panel is formed by a surface of said prism.

7. The apparatus of claim 4 wherein said third surface comprises said back side of said liquid crystal display panel.

8. The electro-optical display recited in claim 5 wherein said light receiving surface of said prism is treated to allow more light to be gathered thereby.

* * * * *